United States Patent
Clerc et al.

[11] 3,891,942
[45] June 24, 1975

[54] METHOD OF PUMPING FOR A LASER AND DEVICE FOR CARRYING OUT SAID METHOD

[75] Inventors: Michel Clerc, Limours; Paul Goujon, Chennevieres-sur-Marne,, France

[73] Assignee: Commissariata l'Energie Atomique, Paris, France

[22] Filed: Sept. 11, 1973

[21] Appl. No.: 396,177

[30] Foreign Application Priority Data
Sept. 24, 1972 France .......................... 72.33492

[52] U.S. Cl. .......................................... 331/94.5 G
[51] Int. Cl. .............................................. H015 3/09
[58] Field of Search ............... 331/94.5; 330/4.3

[56] References Cited
UNITED STATES PATENTS

| | | |
|---|---|---|
| 3,571,745 | 3/1971 | Altman et al. ............... 331/94.5 PE |
| 3,729,689 | 4/1973 | Godard et al. ............... 331/94.5 PE |
| 3,774,063 | 11/1973 | Beiser et al. ............... 331/94.5 PE |

*Primary Examiner*—William L. Sikes
*Attorney, Agent, or Firm*—Cameron, Kerkam, Sutton, Stowell & Stowell

[57] ABSTRACT

A method of pumping for a gas laser which consists in exciting a gas contained in a passage and discharging a structure for the storage and propagation of electrical energy in such a manner as to ensure that the excitation wave is progressive and travels along the axis of the passage in a direction parallel to the stimulated radiation at approximately the same velocity. The discharge is triggered by injecting an electron beam into the passage in a direction parallel to its axis and at a velocity which is close in value to the velocity of the radiation in the gas.

8 Claims, 3 Drawing Figures

PATENTED JUN 24 1975 3,891,942

METHOD OF PUMPING FOR A LASER AND DEVICE FOR CARRYING OUT SAID METHOD

This invention relates to a method of pumping for a laser and to a device for carrying out said method. One application for which the invention is particularly suitable is the construction of lasers which operate in pulses of very short duration.

It has already been proposed to employ a progressive transverse electrical discharge in order to excite a gas and to give rise during a very short period to a population inversion which can result in stimulated emission. By way of example, reference can be made to the article by John D. Shipman entitled "Traveling wave excitation of high power gas lasers" and published in the review "Applied Physics Letters" on Jan. 1, 1967, volume 10, No. 1. In these devices, the progressive character of the discharge is obtained by initiating this latter with the aid of a series of switches which are actuated at well-determined instants. These switches transfer a trigger pulse which initiates the discharge within a gas passage comprising two electrodes which are brought to voltages corresponding to the disruptive threshold of the gas contained within the passage. The highest possible gas pressure is chosen in order to obtain a stimulated emission of high intensity. This pressure is limited, however, by considerations of a practical order which tend to avoid the use of voltages having values exceeding the limits of usual voltage sources.

The progressive transverse discharge devices of the prior art have two major disadvantages : the first arises from the presence of a plurality of switches and the practical difficulties which are always presented by these latter in regard to operation and control ; the second disadvantage is related to the top limit imposed on the pressure which limits the intensity of radiation emitted by this device.

The present invention is precisely directed to a method of pumping for a laser and to a practical device which circumvent the two disadvantages just mentioned. In accordance with the invention, the discharge is no longer triggered by means of a series of switches but by an electron beam, said beam being injected into the passage which is filled with the gas to be excited.

More precisely, the invention is directed to a method of pumping for a laser in which a transverse electric discharge is produced and progresses in a gaseous medium, characterized in that said discharge is triggered by injecting into said gas an electron beam which causes preionization of said gas as the beam passes.

The invention is also directed to a laser pumping device which carries out the method hereinabove defined and comprises :

a passage filled with gas at a predetermined pressure and comprising at least two parallel electrodes located on each side of the axis of said passage, an electric discharge generator comprising an electrostatic energy reservoir which is connected to both electrodes and brings said electrodes to voltages such that the potential difference between the two electrodes is smaller than the disruptive potential of the gas at said pressure, means for triggering said discharge, characterized in that said means are constituted by a source of a beam of electrons injected into said passage in a direction parallel to the axis of said passage and between said electrodes.

The characteristic features and advantages of the invention will become more readily apparent from the following description of one exemplified embodiment which is given by way of explanation without any limitation being implied, reference being made to the accompanying drawings, wherein.

Figure 1:
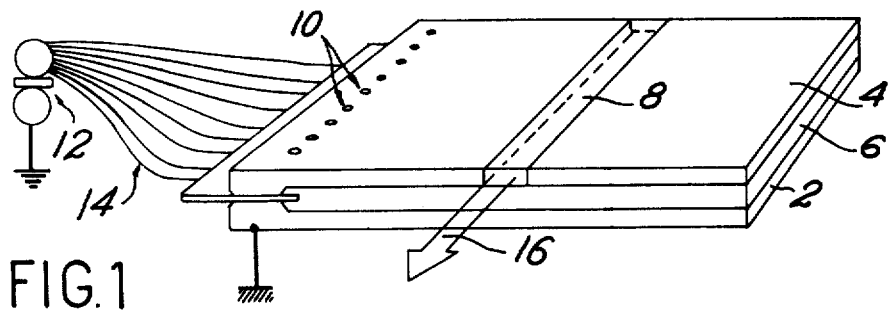
FIG. 1 illustrates a transverse discharge device in accordance with the prior art which employs a plurality of switches for initiating said discharge.

FIG. 1 illustrates a transverse discharge device as described in particular in the article by J. D. Shipman which has already been cited. This device comprises a flat line constituted by two flat conductors 2 and 4, separated by a dielectric 6 ; the conductor 4 defines a passage 8 which is filled with the gas to be excited ; the two conductors 2 and 4 are charged to a very high voltage such that the potential difference is slightly smaller than the disruptive potential of the gas contained in the passage 8. Triggering of the discharge is obtained from a series of switches 10 placed at one end of the flat line and controlled from a single spark-gap 12 which is connected to the switches 10 by coaxial cables 14 of different lengths. Ignition of the single spark-gap 12 gives rise to the sequential closure of the switches 10 and to the discharge of the flat line within the passage 8 ; this discharge progresses along the passage as it follows the control action of the switches 10.

The gas contained in the passage 8 is thus excited by a traveling wave of very high instantaneous power and of very short duration ; each element of the formed plasma emits a radiation which can stimulate further radiations, mainly in the axis of the passage 8 and in the direction of propagation of the electrical excitation. If the excitation progresses within the passage 8 at a phase velocity which is closely related in value to the velocity of light within the passage 8, optimum interaction of stimulated radiation and plasma is thus achieved and a stimulated radiation 16 of high intensity and short duration is obtained at the end of the passage. Since a laser of this type has a high gain, it usually proves unnecessary to make use of a mirror cavity of the type usually provided in other lasers. The laser then operates in the condition known as superradiance.

In a progressive transverse discharge device, the synchronism between the phase velocity of the excitation wave and the velocity of the stimulated radiation is essential. The control of the different switches therefore plays a part of key importance and determines the performances of the laser. In accordance with the invention, this synchronism is obtained by producing a triggering action which is related to the pre-ionization caused by the traversal within the gaseous medium to be excited, of an electron beam which is injected along the axis of the passage. A device of this type is shown diagrammatically in FIG. 2.

By way of explanatory illustration, this figure shows an energy reservoir 21 which is constituted in the same manner as the device shown in FIG. 1, by two flat conductors 20 and 22 separated by a dielectric 24 ; by way of example, the conductor 22 is connected to ground and the conductor 20 is brought to a very high voltage supplied by a voltage source 26. The passage 28 is filled with gas and comprises two parallel metallic electrodes 30 and 32 placed on each side of the axis of the passage. The electrodes 30 and 32 are spaced at a distance $d$ and connected respectively to the conductors 22 and 20 of the energy reservoir. The potential difference between the electrodes 30 and 32 is smaller than the disruptive potential of the gas at the filling pressure of the passage 28. An electron beam source 40 which can be provided especially in the form of an electron accelerator emits an electron beam 42, said beam being injected between the electrodes 30 and 32 in a direction parallel to the axis of the passage 28. As it traverses the passage, said electron beam 42 causes preionization of the gas contained in the passage 28 and thus triggers the discharge of the reservoir 21 within the preionization zone. This discharge therefore progresses within the passage together with the electron beam 42.

The first advantage of this method of triggering is that it avoids the need for a plurality of switches as well as the problems attached to the sequential control of these switches.

The second advantage arises from the fact that the velocity of the electrons of the beam 42 can easily be regulated so as to synchronize the excitation wave with the radiation which is emitted axially by the excited gas. In particular, one advantageous possibility consists in injecting the electrons at a velocity which corresponds substantially to the velocity of light within the passage 28, taking into account the index of the gas, that is to say in injecting the electrons with an energy in the vicinity of the Cerenkov effect threshold. Optimum interaction between the stimulated radiation and the excited gas is then achieved.

A third advantage which is inherent both in the method and in the device relates to the short pulse duration. The durations of excitation pulses which are usually required in devices of this type are very short and can be of the order of one nanosecond. This requisite condition arises from the nature of the transitions which are employed in this type of laser and which usually connect two excited states of the gas, the lower state of which is metastable and prevents the population inversion from extending beyond durations of the same order as the radiative lifetime of the upper level, which is liable to be very short. It is therefore an advantage as a rule to obtain ultra-short excitations. This characteristic feature is readily obtained by means of the method and the device according to the invention since the electron accelerator 40 can easily emit pulses having a duration which is either shorter than or equal to one nanosecond in respect of very high current values which can attain $10^4$ amps, for example. A fortiori, the pumping conditions are very favorable in the case of lower durations, especially of the order of one picosecond.

Figure 3:
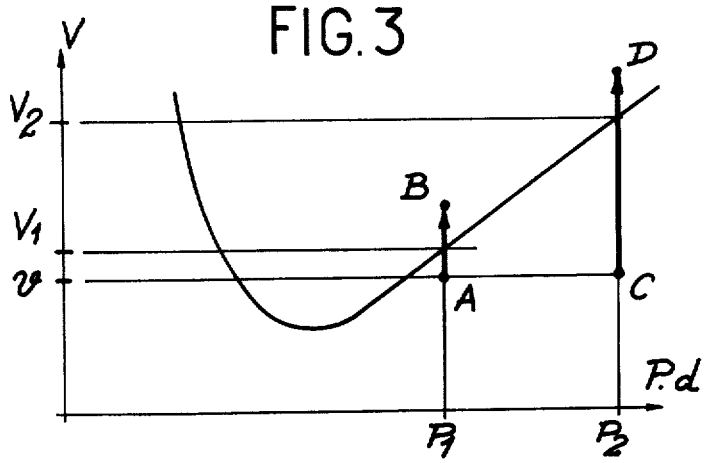
FIG. 3 is a curve which shows the variation in disruptive potential as a function of the gas pressure and serves to compare the conditions of operation of the devices of the prior art with the device according to the invention.

A further advantage of the device according to the invention concerns the top pressure limit which is imposed on devices of the prior art. This advantage will be understood more clearly by reference to FIG. 3. The curve which is plotted in this figure shows the variation in disruptive potential $V$ as a function of the product $P.d$ of the gas pressure $P$ and of the interelectrode distance $d$. In the devices of the prior art, the passage filling pressure is determined by the maximum voltage which can possibly be obtained by means of devices of the usual type ; if this limit is V1, then in the case of a given distance $d$, the corresponding filling pressure is P1 and the charge voltage of the energy reservoir is defined by a point A corresponding to a potential difference v which is slightly smaller than V1. The electrical trigger action produced by the switch causes the operating point to move above the disruption curve and this initiates the discharge in the gas.

In the device according to the invention, however, it is possible to fill the excitation passage at a pressure P2 which is higher than P1, the two conductors of the energy reservoir being always charged to voltages corresponding to the potential difference $v$ (point C). The intense pre-ionization produced by the electron beam causes the operating point to move to D which is located beyond the disruptive potential, thereby initiating the discharge in the gas. In the case of devices of the prior art, this pressure P2 would result in a charge voltage V2 which is considerably higher than the voltage V1 and would be difficult to obtain with known means. Thus, the pressure of the filling gas can be considerably increased by means of the triggering method according to the invention which results in a proportional increase in the luminous intensity emitted in the axis of the passage.

Figure 2:
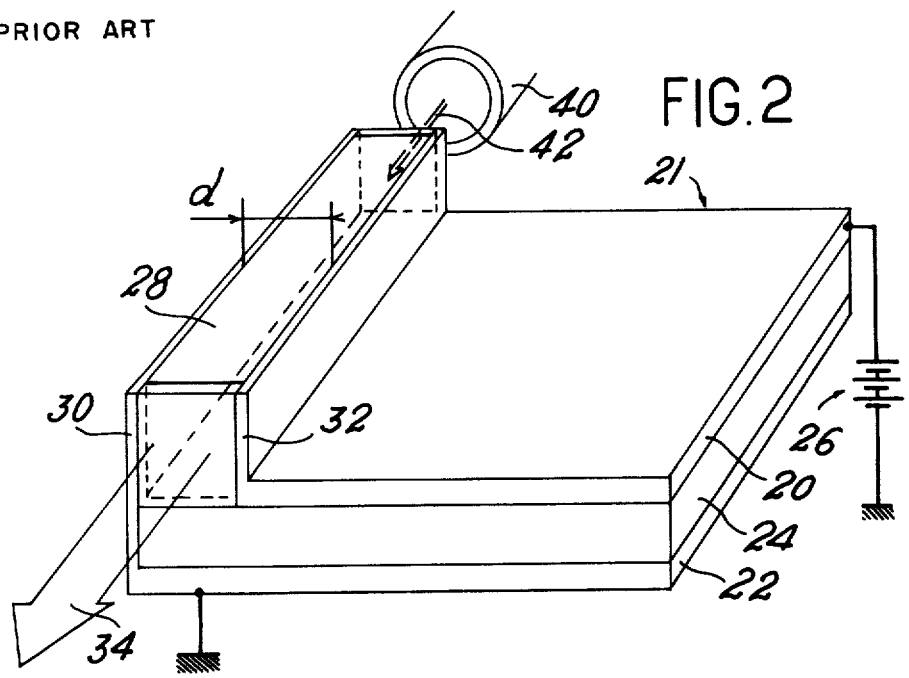
FIG. 2 is a diagrammatic presentation of a pumping device in accordance with the invention in which an electron accelerator is employed for initiating the discharge.

In FIG. 2, there is shown an excitation device comprising a single energy reservoir 21 connected to the pair of electrodes 30 and 32 ; in point of fact, the discharge within the passage 28 is perfectly determined both spatially and in time by the pre-ionization produced by the traversal of the electron beam 42 ; it is accordingly possible to make use of a number of reservoirs which are similar to the reservoir 21 and connected in parallel to a corresponding number of pairs of electrodes placed within the gas passage, the discharges of these different reservoirs being prefectly synchronous. This possibility represents a further advantage of the invention and therefore permits a considerable increase in the stored energy and consequently in the excitation energy without having any adverse effect on the synchronism of discharges within the passage.

The gas employed for filling the passage 28 can be nitrogen, thereby resulting in particular in a stimulated radiation at 3,371 A. The gas can also be neon, which results in a radiation at a wavelength of 5,401 A.

In the foregoing description, stress has been laid on the pre-ionization caused by the passage of the electron beam. This effect can be accompanied by a process of direct excitation of the gas by the electron beam which can enhance the excitation resulting from the electric discharge. The conditions under which an electron beam injected into a gas can create a population inversion therein have been studied by the present Applicant and published in particular in "Compte-rendus a Academie des Sciences" Vol. 272, pages 668–671, series B, on March 15, 1971 in an article entitled : "Emissions stimulees des systemes premier et deuxieme positif de N2, produites par radiolyse impulsionnelle" by M. Clerc and M. Schmidt. However, the optimum conditions of direct excitation by the electron beam are obtained when the electrons are slowed down until they possess an energy corresponding to the maximum value of the excitation cross-section of the gas which is employed. This condition does not usually coincide with the first condition attached to the synchronism between electrons and stimulated radiation, in which it is recommended on the contrary to accelerate the electrons to the Cerenkov-effect threshold so that, in practice, the contribution of the direct excitation is of small value. Nevertheless, the maximum cross-section in some gases can be of a high order and the method of triggering in accordance with the invention has the effect of enhancing the stimulated emission.

What we claim is :

1. A method of pumping for a gas laser which consists in exciting a gas contained in a passage and discharging a structure for storage and propagation of electrical energy in such a manner as to ensure that the excitation wave is progressive and travels along the axis of said passage in a direction parallel to the stimulated radiation and at a velocity in the vicinity of the velocity of said radiation, wherein said discharge is initiated by injecting an electron beam into said passage in a direction parallel to its axis at a velocity in the vicinity of the velocity of said radiation in said gas.

2. A device according to claim 1, wherein said means provides an electron beam of a duration on the order of 1 nanosecond.

3. A device according to claim 1, wherein said means provides an electron beam of a duration on the order of 1 picosecond.

4. A device for a laser, comprising:

a passage filled with gas at a predetermined pressure and comprising two parallel electrodes located on each side of the axis of said passage, an electric discharge generator comprising a structure for storage of electrostatic energy formed of at least one flat line constituted by two flat conductors isolated by a dielectric, one conductor being connected to ground and the other conductor being brought to a potential which is lower than the disruptive potential of said gas at said pressure, each of the two conductors aforesaid being connected to one of said electrodes, means for providing and injecting a beam of electrons for triggering said discharge into said passage in a direction parallel to the axis of said passage and between said electrodes at a velocity in the vicinity of the velocity of light within said passage.

5. A device according to claim 4, wherein said means is an electron accelerator.

6. A device according to claim 4, wherein said reservoir is constituted by a plurality of partial reservoirs connected in parallel to a plurality of pairs of electrodes.

7. A device according to claim 4, wherein said gas is nitrogen.

8. A device according to claim 4, wherein said gas is neon.

* * * * *